Figure 1:
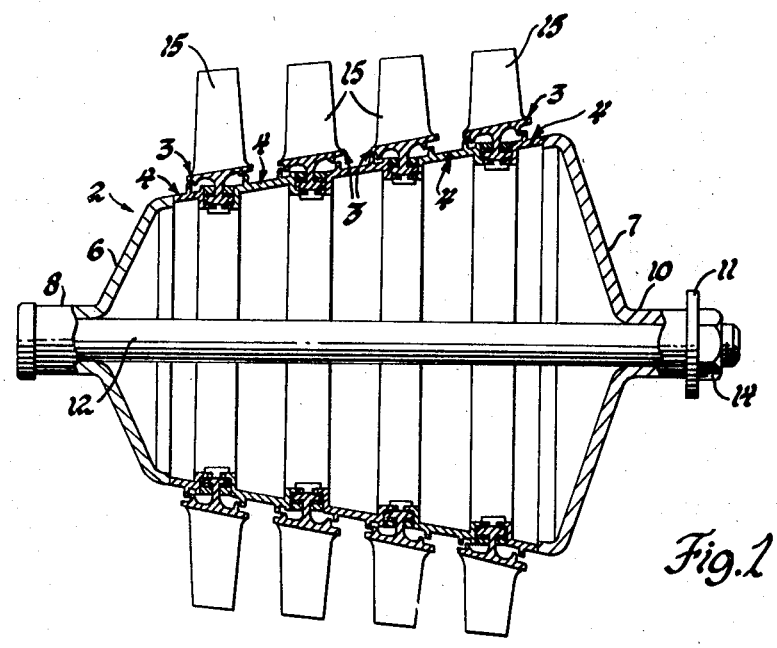

United States Patent

[11] 3,610,772

[72] Inventor Joseph A. Wagle
Indianapolis, Ind.
[21] Appl. No. 34,055
[22] Filed May 4, 1970
[45] Patented Oct. 5, 1971
[73] Assignee General Motors Corporation
Detroit, Mich.

[54] BLADED ROTOR
5 Claims, 2 Drawing Figs.
[52] U.S. Cl. .................................................. 416/198,
416/218, 416/244
[51] Int. Cl. ....................................................... F01d 5/30
[50] Field of Search ........................................... 416/198 A,
218, 213, 244

[56] References Cited
UNITED STATES PATENTS

| | | | |
|---|---|---|---|
| 3,501,090 | 3/1970 | Stoffer et al. ................. | 416/230 X |
| 3,515,501 | 6/1970 | Palfreyman et al. .......... | 416/230 X |
| 3,519,368 | 7/1970 | Howald ......................... | 416/230 X |
| 3,554,667 | 1/1971 | Wagle ........................... | 416/218 X |
| 3,554,668 | 1/1971 | Wagle ........................... | 416/230 X |

Primary Examiner—Everette A. Powell, Jr.
Attorneys—Paul Fitzpatrick and Jean L. Carpenter ABSTRACT: A turbomachine rotor of alternating bladed rings and spacer rings, the bladed rings including blades welded to a rim, a web extending radially inward from the rim, and flanges extending from both faces of the web, with a reinforcing ring of filament reinforced composite material serving to resist centrifugal forces on each flange.

PATENTED OCT 5 1971 3,610,772

INVENTOR.
Joseph A. Wagle
BY
Paul Fitzpatrick
ATTORNEY

BLADED ROTOR

My invention is directed to improved structures of turbomachine rotors, and particularly to a strong lightweight composite drum rotor for turbomachines such as axial flow compressors and turbine.

The principal objects of my invention are to provide improved lightweight rotor structures particularly suited to minimize and to withstand the centrifugal stresses arising from high-speed rotation, to provide a readily assembled rotor structure particularly suited to advantageously exploit the very high tensile strength of filament reinforced composite materials; and to provide such a structure particularly suited to modern techniques of fabrication.

Describing the preferred embodiment of my invention briefly, a rotor is made up of a number of alternating bladed rings and spacer rings, the bladed rings having blades welded to the outer surfaces of the ring and having an inwardly extending web from which flanges extend in both directions axially of the rotor. These flanges are reinforced against centrifugal force by a ring of filament reinforced composite material. The spacer rings pilot the blade carrying rings radially and abut the flanges of the blade-carrying rings. Preferably, a spline arrangement between the spacer rings and blade-carrying rings provides for transmission of torque through the rotor. The structure may advantageously employ a "standoff ring" structure which forms part of the subject matter of a prior patent application.

The nature of my invention and its advantages should be clear to those skilled in the art from the succeeding detailed description and accompanying drawings of the preferred embodiment of the invention.

Referring to the drawings, FIG. 1 is a sectional view of a drum rotor taken in a plane containing the axis thereof, the end bells and shaft being shown somewhat schematically.

Figure 2:
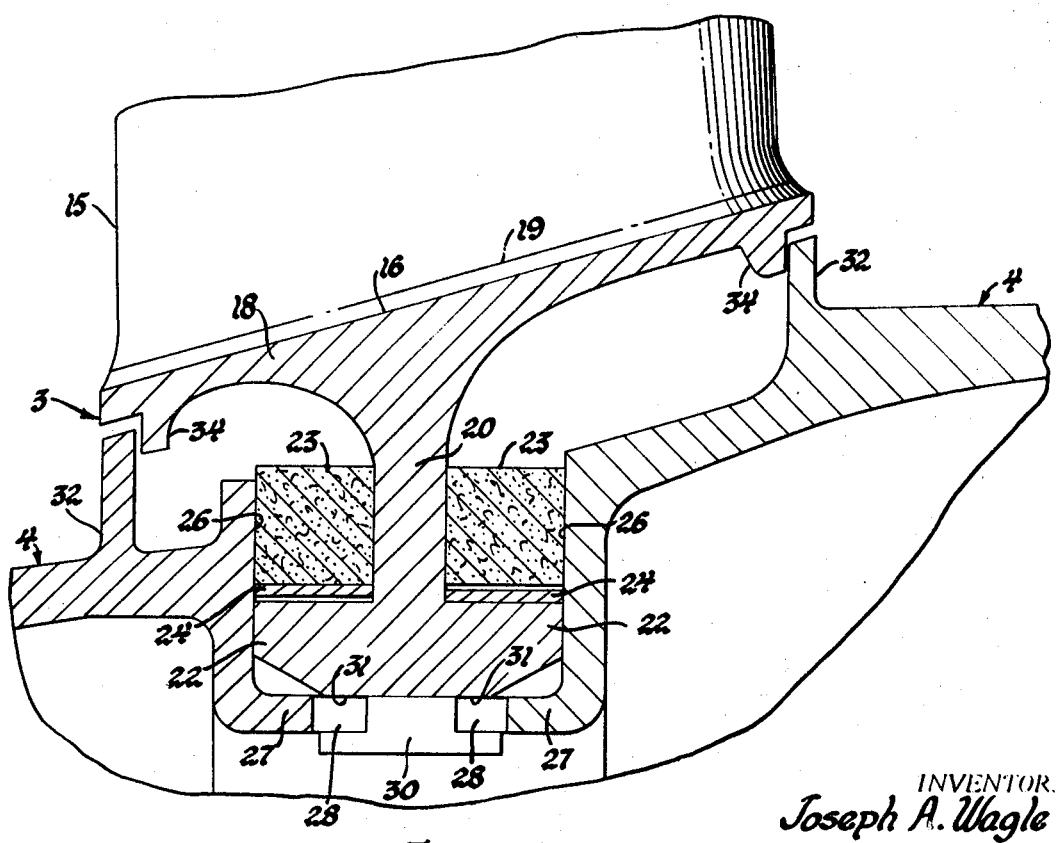

FIG. 2 is a greatly enlarged view of a portion of FIG. 1 illustrating more clearly the subject matter of the invention.

FIG. 1 shows a rotor for a four stage axial flow compressor. The rotor comprises a drum 2 made up of four bladed rings 3, five spacer rings 4 alternating with the bladed rings 3, and two end bells 6 and 7. As illustrated, the end bells are integral with stub shafts 8 and 10 by which the drum may be mounted for rotation in suitable bearings, stub shaft 10 having a driving flange 11. The parts 3, 4, 6, and 7 are held together by a tie bolt or shaft 12 and a nut 14. The end bells may have any suitable shape, depending upon the particular design. As shown, the rotor drum progressively increases in diameter from its low pressure end (the left end as illustrated), but this also is a matter of design. In general, the stages of the compressor are as near alike as feasible although they may differ in the length and chord of the blades and, ordinarily, the number of blades in the several stages.

Referring now to details of structure, each bladed ring 3 includes a row of blades 15 of suitable airfoil section, which may be hollow as illustrated in FIG. 2. The blades 15 extend radially outward from a continuous annular blade carrying ring 16, specifically from a rim portion 18 of the ring which extends axially of the rotor at least as great a distance as the axial projection of the chord of the base of the blade 15. The blades 15 are welded at their bases along the line 19 to the rim by any suitable technique of welding, as, for example, ultrasonic spot welding. It is preferred for minimization of weight to eliminate any mechanical connection such as a dovetail between the blades and the blade carrying ring.

The rim portion 18 of the blade carrying ring is integral with a web 20 which extends radially inward approximately at the midpoint of the axial length of the rim and more particularly at the plane of the center of mass of the bladed ring. The web 20 terminates in two axially extending flanges 22, one extending forwardly and the other rearwardly from the web 20. The radially outer surfaces of these flanges are cylindrical. Two reinforcing rings 23 of filament reinforced composite material encircle the flanges 22 and serve to resist the centrifugal forces developed in the flanges and the forces transmitted from the blades and rim and web through the web to these flanges.

In most cases, a standoff ring 24 should be provided between the flanges 22 and reinforcing rings 23 for reasons pointed out in my copending patent application, of common ownership with this application, Ser. No. 823,608 for Turbomachine Rotor, filed May 12, 1969 now Pat. No. 3,554,668. Briefly, the standoff rings are continuous or noncontinuous corrugated or wavy spring rings which transmit force radially between the parts 22 and 23 while permitting some relative growth between them. They are provided to compensate for the different elastic properties and, in some cases, different thermal expansion of the blade carrying ring 16 and the reinforcing rings 23.

The rings 23 may be produced on a suitable mandrel and then shrunk or pressed in place over the flanges 22. They are retained by the spacer rings 4 at each side of the bladed ring 3. Each of these rings includes inwardly directed flanges 26 each with a radial face which bears against the spacer ring 23 and against the lateral face of a flange 22. The flanges 26 bear at their inner coupling edges flanges 27 the edges of which bear dog or spline teeth 28 between which fit drive dogs or splines 30 extending from the inner surface of the web 20 and flanges 22. These parts 28 and 30 provide an intermeshing spline arrangement for positive transmission of torque between the parts of the rotor. Obviously, any other suitable torque carrying arrangement may be used.

The flanges 27 pilot within the inner surface of the blade carrying ring 16 as indicated at 31 to align the successive bladed rings and spacer rings radially of the rotor.

In the preferred structure, the spacer rings bear circumferentially extending ridges 32 the outer margins of which closely approach the edges of the rim 18, but with slight clearance. The rim bears inwardly extending flanges 34 which closely approach the ridges 32.

The radially outer surfaces of the spacer rings 4 may cooperate with the inner shrouds of stator blade rows to minimize bypassing of the stator blade rows, as is well understood by those skilled in the art.

The first and last of the spacer rings 4; that is, those immediately adjacent the end bells 6 and 7 may be similar in structure to the intermediate spacer rings except that they have only one end to cooperate with a bladed ring. These may, if desired, be integral with the end bells or may be coupled to the end bells through any suitable spline connection or other arrangement, including a welded connection.

The rotor structure described herein, although quite different in many respects from that of my prior application referred to above, is intended to employ the same types of lightweight high strength materials according to the state of the art as it now exists or may develop in the future. The choice of materials will depend to some extent upon installation, particularly the temperatures involved. The presently preferred materials for the reinforced rotor described are titanium for the blade rings and spacer rings and a carbon or boron filament and epoxy resin composite for the reinforcing rings 23. The standoff springs may be of steel, and the end bells preferably of titanium.

It will be clear to those skilled in the art from the foregoing that the rotor structure described is particularly suited to the minimization of weight and to ready manufacture of a high-speed rotor structure.

The detailed description of preferred embodiments of the invention for the purpose of explaining the principles thereof is not to be considered as limiting or restricting the invention, as many modifications may be made by the exercise of skill in the art.

I claim:

1. A turbomachine rotor comprising, in combination, bladed rings, spacer rings disposed between and abutting adjacent bladed rings, and means retaining the bladed rings and spacer rings fixed together in abutting relation to form a drum rotor; each bladed ring comprising an axially extending rim bearing a ring of blades extending radially outward from the rim, a web integral with the rim extending radially inward from near the middle of the rim, a flange integral with the web extending axially from each face of the web, and a reinforcing ring of filament reinforced composite material disposed around the outer surface of each flange.

2. A turbomachine rotor comprising, in combination, bladed rings, spacer rings disposed between and abutting adjacent bladed rings, and means retaining the bladed rings and spacer rings fixed together in abutting relation to form a drum rotor; each bladed ring comprising an axially extending rim bearing a ring of blades extending radially outward from the rim, a web integral with the rim extending radially inward from near the middle of the rim, a flange integral with the web extending axially from each face of the web, and a reinforcing ring of filament reinforced composite material disposed around the outer surface of each flange; the flanges abutting the adjacent spacer rings.

3. A turbomachine rotor comprising, in combination, bladed rings, spacer rings disposed between and abutting adjacent bladed rings, and means retaining the bladed rings and spacer rings fixed together in abutting relation to form a drum rotor; each bladed ring comprising an axially extending rim bearing a ring of blades extending radially outward from the rim, a web integral with the rim extending radially inward from near the middle of the rim, a flange integral with the web extending axially from each face of the web, and a reinforcing ring of filament reinforced composite material disposed around the outer surface of each flange; the flanges abutting the adjacent spacer rings, and the spacer rings being piloted within the bladed rings.

4. A rotor as defined in claim 3 including also a torque-transmitting spline connection between the said flanges and the spacer rings.

5. A turbomachine rotor comprising, in combination, bladed rings, spacer rings disposed between and abutting adjacent bladed rings, and means retaining the bladed rings and spacer rings fixed together in abutting relation to form a drum rotor; each bladed ring comprising an axially extending rim, a ring of blades extending radially outward from the rim and welded to the rim, a web integral with the rim extending radially inward from near the middle of the rim, a flange integral with the web extending axially from each face of the web, and a reinforcing ring of filament reinforced composite material disposed around the outer surface of each flange.

PO-1050
(5/69)

UNITED STATES PATENT OFFICE
CERTIFICATE OF CORRECTION

Patent No. 3,610,772   Dated October 5, 1971

Inventor(s) Joseph A. Wagle

It is certified that error appears in the above-identified patent and that said Letters Patent are hereby corrected as shown below:

Column 1, after the title, insert the following paragraph -- The invention herein described was made in the course of work under a contract or subcontract thereunder with the Department of Defense. --

Signed and sealed this 2nd day of May 1972.

(SEAL)
Attest:

EDWARD M. FLETCHER, JR.
Attesting Officer

ROBERT GOTTSCHALK
Commissioner of Patents